United States Patent
Kuroda et al.

(10) Patent No.: US 9,463,845 B2
(45) Date of Patent: Oct. 11, 2016

(54) BICYCLE GEAR CHANGING CONTROL APPARATUS

(71) Applicant: Shimano Inc., Sakai, Osaka (JP)

(72) Inventors: Mao Kuroda, Osaka (JP); Nobuyuki Kakinoki, Osaka (JP); Kazuhiro Fujii, Osaka (JP); Hideki Ikemoto, Osaka (JP)

(73) Assignee: Shimano Inc., Osaka (JP)

( * ) Notice: Subject to any disclaimer, the term of this patent is extended or adjusted under 35 U.S.C. 154(b) by 48 days.

(21) Appl. No.: 14/561,861

(22) Filed: Dec. 5, 2014

(65) Prior Publication Data

US 2015/0210354 A1 Jul. 30, 2015

(30) Foreign Application Priority Data

Jan. 27, 2014 (JP) ................. 2014-012456

(51) Int. Cl.
| | |
|---|---|
| *B62M 25/08* | (2006.01) |
| *B62M 9/12* | (2006.01) |
| *F16H 61/684* | (2006.01) |

(52) U.S. Cl.
CPC ............. *B62M 9/12* (2013.01); *B62M 25/08* (2013.01); *F16H 61/684* (2013.01)

(58) Field of Classification Search
None
See application file for complete search history.

(56) References Cited

U.S. PATENT DOCUMENTS

| | | | | |
|---|---|---|---|---|
| 6,646,400 | B2 * | 11/2003 | Uno | B62M 6/45 315/78 |
| 7,595,642 | B2 * | 9/2009 | Doyle | H02J 1/14 320/132 |
| 7,798,929 | B2 * | 9/2010 | Takamoto | B62M 25/08 474/80 |
| 7,874,567 | B2 | 1/2011 | Ichida et al. | |
| 2011/0238250 | A1 * | 9/2011 | Takao | B60L 1/16 701/22 |
| 2012/0253601 | A1 * | 10/2012 | Ichida | B60G 17/018 701/37 |
| 2014/0290411 | A1 | 10/2014 | Kuroda | |

* cited by examiner

*Primary Examiner* — Justin Holmes
(74) *Attorney, Agent, or Firm* — Global IP Counselors

(57) ABSTRACT

A bicycle control apparatus is basically provided with a first gear changing device, a second gear changing device, a power supply sensor and a gear shift controller. The first gear changing device has a plurality of first shifting positions. The second gear changing device has a plurality of second shifting positions. The power supply sensor detects a power level of a power supply that is configured to supply power to at least one of the first and second gear changing device. The gear shift controller is programmed to cooperatively control the first and second gear changing devices, the gear shift controller being further programmed to individually control the first and second gear changing devices when the power level detected by the power supply sensor is lower than a first power level.

11 Claims, 10 Drawing Sheets

|  | | FC | | |
|---|---|---|---|---|
|  | | 24 | 32 | 42 |
|  | | Low | Mid | Top |
| CS | 36 1st | 0.67 | 0.89 | 1.17 |
|  | 32 2nd | 0.75 | 1.00 | 1.31 |
|  | 28 3rd | 0.86 | 1.14 | 1.50 |
|  | 24 4th | 1.00 | 1.33 | 1.75 |
|  | 21 5th | 1.14 | 1.52 | 2.00 |
|  | 19 6th | 1.26 | 1.68 | 2.21 |
|  | 17 7th | 1.41 | 1.88 | 2.47 |
|  | 15 8th | 1.60 | 2.13 | 2.80 |
|  | 13 9th | 1.85 | 2.46 | 3.23 |
|  | 11 10th | 2.18 | 2.91 | 3.82 |

FIG. 5

| | | | FC | | |
|---|---|---|---|---|---|
| | | | 24 | 32 | 42 |
| | | | Low | Mid | Top |
| CS | 36 | 1st | 0.67 | 0.89 | 1.17 |
| | 32 | 2nd | 0.75 | 1.00 | 1.31 |
| | 28 | 3rd | 0.86 | 1.14 | 1.50 |
| | 24 | 4th | 1.00 | 1.33 | 1.75 |
| | 21 | 5th | 1.14 | 1.52 | 2.00 |
| | 19 | 6th | 1.26 | 1.68 | 2.21 |
| | 17 | 7th | 1.41 | 1.88 | 2.47 |
| | 15 | 8th | 1.60 | 2.13 | 2.80 |
| | 13 | 9th | 1.85 | 2.46 | 3.23 |
| | 11 | 10th | 2.18 | 2.91 | 3.82 |

FIG. 6

| | | | FC | |
|---|---|---|---|---|
| | | | 24 | 38 |
| | | | Low | Top |
| CS | 36 | 1st | 0.67 | 1.06 |
| | 32 | 2nd | 0.75 | 1.19 |
| | 28 | 3rd | 0.86 | 1.36 |
| | 24 | 4th | 1.00 | 1.58 |
| | 21 | 5th | 1.14 | 1.81 |
| | 19 | 6th | 1.26 | 2.00 |
| | 17 | 7th | 1.41 | 2.24 |
| | 15 | 8th | 1.60 | 2.53 |
| | 13 | 9th | 1.85 | 2.92 |
| | 11 | 10th | 2.18 | 3.45 |

FIG. 7

BICYCLE GEAR CHANGING CONTROL APPARATUS

CROSS-REFERENCE TO RELATED APPLICATIONS

This application claims priority under 35 U.S.C. §119 to Japanese Patent Application No. 2014-012456, filed Jan. 27, 2014. The entire disclosure of Japanese Patent Application No. 2014-012456 is hereby incorporated herein by reference.

BACKGROUND

1. Field of the Invention

This invention generally relates to a bicycle gear changing control apparatus. More specifically, the present invention relates to a bicycle gear changing control apparatus that can be operated with an electrical power supplied from a power supply and that controls at least one of a first gear changing device having a plurality of first shift positions and a second gear changing device having a plurality of second shift positions.

2. Background Information

A bicycle gear changing control apparatus for controlling the first gear changing device (e.g., the front derailleur) and the second gear changing device (e.g., the rear derailleur) of a bicycle configured to shift gears electrically such that the user can perform the gear shifting operation comfortably is known conventionally (see, for example, U.S. Pat. No. 7,874,567). In a conventional bicycle gear changing control apparatus, the first gear changing device is operated by the first shift operating device, and the second gear changing device is operated by the second shift operating device. Also, the conventional bicycle shifting control apparatus detects the power level of the power supply and inhibits the operation of the first gear changing device that has a high power consumption and allows the operation of the second gear changing device that has a low power consumption when the power level is below a prescribed value. Accordingly, the power consumption can be suppressed, and the supply of power is not easily cut off while riding.

SUMMARY

In a conventional bicycle changing control apparatus such as mentioned in the above patent, a shifting operation of the first gear changing device may be prevented when the power level is below a prescribed value. Therefore, the power consumption can be suppressed, and the rider convenience is improved. However, there is a need to further improve the convenience for the rider.

Generally, the present disclosure is directed to various features of a gear changing control apparatus. One object of the present invention is to further improve the rider convenience in the case in which the power level of the power supply decreases.

The bicycle gear changing control apparatus related to the present invention can be operated with the electrical power supplied from a power supply and controls at least one of a first gear changing device having a plurality of first shift positions and a second gear changing device having a plurality of second shift positions. The bicycle gear changing control apparatus includes a power supply sensor for detecting the power level of the power supply and a gear shift controller configured to cooperatively control the first gear changing device and the second gear changing device. The gear changing controller individually controls the first gear changing device and the second gear changing device when the power level detected by the power supply sensor is lower than the first power level.

This bicycle gear changing control apparatus controls the first gear changing device and the second gear changing device individually when the power level detected by the power supply sensor is lower than the first power level. Therefore, control of one of the first gear changing device and the second gear changing device is not easily inhibited even if the power level of the power supply decreases. Accordingly, rider convenience can be further improved even if the power level of the power supply decreases.

The first gear changing device can include a front derailleur that moves the chain to any of the plurality of front sprockets having different tooth counts. The gear changing controller at least partially inhibits shifting to the front sprocket side of the front derailleur that has a large tooth count when the power level detected by the power supply sensor is lower than the first power level. In this case, upshifting requiring greater power consumption than downshifting is inhibited, and the power consumption can be suppressed. Also, downshifting can be performed; thus, shift the rider convenience can be further improved.

The second gear changing device can include a rear derailleur that moves the chain to any of the plurality of front sprockets having different tooth counts. The gear changing controller allows shifting to the rear sprocket side of the rear derailleur that has a large tooth count and shifting to the rear sprocket side that has a small tooth count when the power level detected by the power supply sensor is lower than the first power level. In this case, shifting of the rear derailleur is allowed even when the power level of the power supply decreases to the first power level. Therefore, the rider convenience can be further improved.

The gear changing controller can inhibit control of the first gear changing device and the second gear changing device after controlling at least one of a first gear changing device and a second gear changing device to a prescribed shifting position when the power level detected by the power supply sensor is lower than the second power level, which is lower than the first power level. In this case, the first gear changing device and the second gear changing device are controlled to be at shifting positions that suppress the consumption of the power supply and facilitate riding. Accordingly, the rider can ride the bicycle easily even if the power level becomes lower than the second power level, and the rider convenience can be further improved.

The gear changing controller can inhibit control of the first gear changing device and the second gear changing device when the power level detected by the power supply sensor is lower than the second power level, which is lower than the first power level. In this case, control of the first gear changing device and the second gear changing device is inhibited when the power level becomes lower than the second power level; therefore, the power consumption can be further suppressed.

The bicycle gear changing control apparatus can be equipped with a signal output unit that outputs a first signal and a second signal to the gear changing controller. The gear changing controller controls at least one of a first gear changing device and a second gear changing device in order to pass along a prescribed shifting route that includes at least a portion of the shifting positions of the plurality of first shifting positions and the plurality of second shifting positions when the power level detected by the power supply sensor is higher than the first power level, and a first signal is output. When a second signal is output, at least one of a first gear changing device and a second gear changing device is controlled in order to pass along a portion of the prescribed shifting route. In this case, if the first signal is output, the first gear changing device and the second gear changing device are not controlled individually, and the first gear changing device and the second gear changing device are cooperatively controlled. Therefore, the rider can perform upshifting and downshifting efficiently without thinking about the gear ratio of the first gear changing device and the second gear changing device. Also, when a second signal is output, the shifting operation can be performing by short cutting a portion of the prescribed shifting route. Therefore, the shifting operation can be performed quickly. Accordingly, the convenience in the shifting operation is further improved.

The signal output unit can output a third signal, a fourth signal, and a fifth signal to the gear changing controller. The gear changing controller controls the first gear changing device such that the plurality of first shifting positions are changed to the front sprocket side having a small tooth count when the power level detected by the power supply sensor is lower than the first power level, and a third signal is output. The second gear changing device is controlled such that the plurality of second shifting positions are changed sequentially to one of the shifting directions when a fourth signal is output. The second gear changing device is controlled such that the plurality of second shifting positions are changed to another shifting direction when a fifth signal is output.

In this case, the downshifting operation of the front derailleur, as well as the upshifting and downshifting of the rear derailleur, can be performed even when the power level is lower than the first power level. Therefore, the rider convenience can be further improved.

The bicycle gear changing control apparatus can be further equipped with a notification unit for providing information that the power level detected by the power supply sensor has become lower than the first power level. In this case, the rider can easily recognize the power level of the power supply. The notification of the fact that the power level of the power supply has become lower than the first power level is provided by a sound, a display, a vibration or the like. Therefore, a rider can be informed of a decrease in the power level through sound, sight, touch, or the like.

According to the present invention, the rider convenience can be improved even if the power level of the power supply decreases.

Also other objects, features, aspects and advantages will become apparent to those skilled in the art from the following detailed description, which, taken in conjunction with the annexed drawings, discloses illustrative embodiments.

BRIEF DESCRIPTION OF THE DRAWINGS

Referring now to the attached drawings which form a part of this original disclosure:

FIG. 5 is a first shift table that illustrates one example of a cooperative (synchro-shift) control of a pair of gear changing devices used with a drive train having three front sprockets and ten rear sprockets;

FIG. 6 is a second shift table that illustrates another example of a cooperative (synchro-shift) control in a gear changing device that has three front sprockets and ten rear sprockets;

FIG. 7 is a third shift table that illustrates one example of a cooperative control in a gear changing device that has two front sprockets and ten rear sprockets;

DETAILED DESCRIPTION OF EMBODIMENTS

Selected embodiments will now be explained below with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
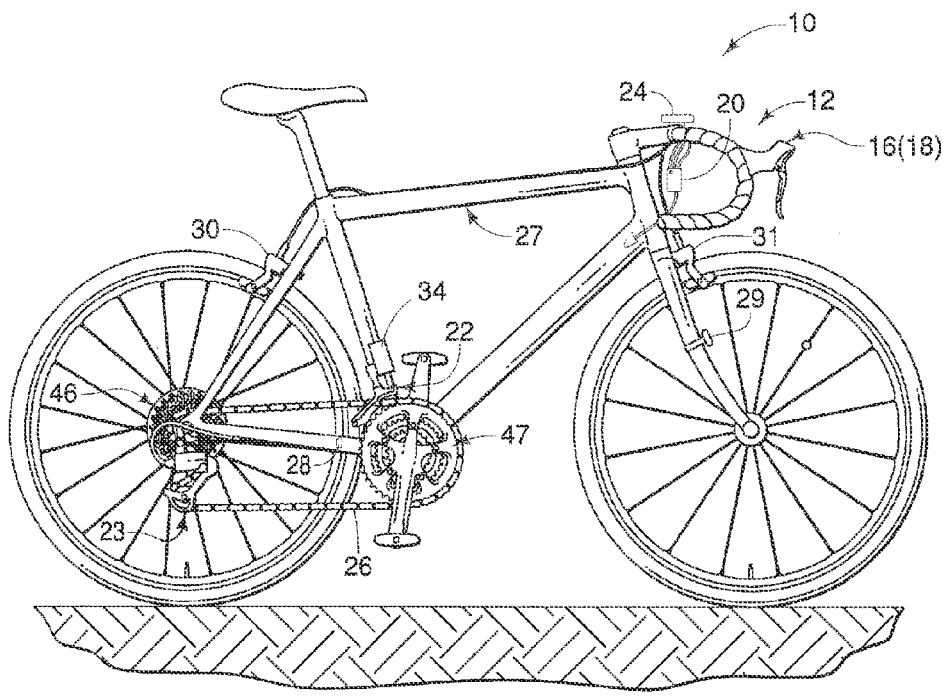
FIG. 1 is a side elevational view of a bicycle that is equipped with a bicycle gear changing control apparatus in accordance with one embodiment.

Referring initially to FIG. 1, a bicycle 10 is illustrated that is equipped with a gear changing control apparatus 12 in accordance with a first embodiment. While bicycle 10 is illustrated as a road bike, the gear changing control apparatus 12 is not limited to use with the road bike illustrated in FIG. 1, and can be applied to mountain bikes or any type of bicycle.

Figure 2:
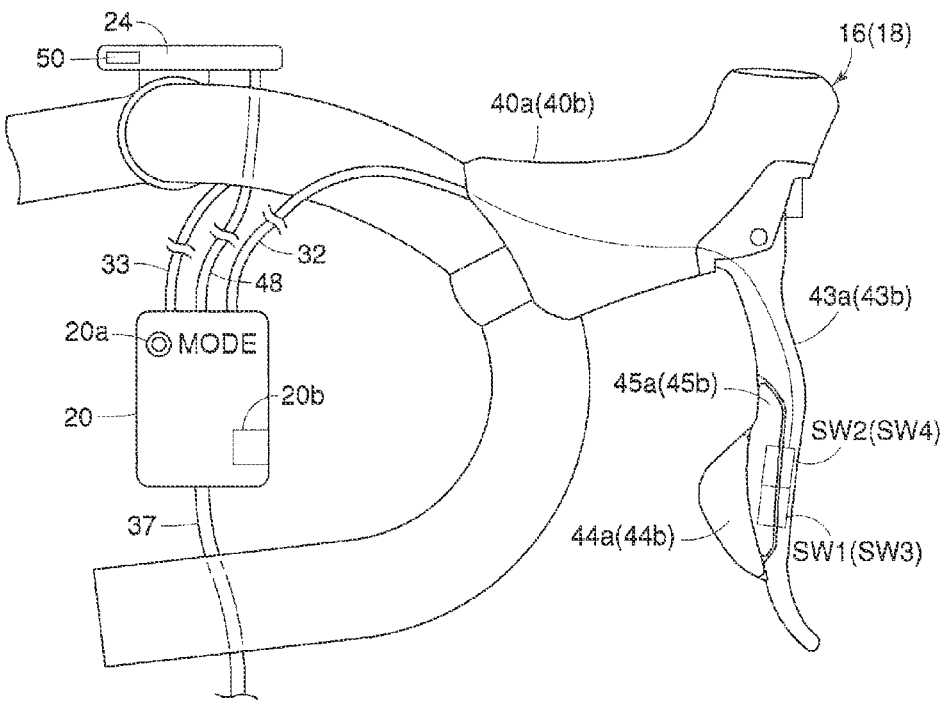
FIG. 2 is a side elevational view of a handlebar of the bicycle equipped with the bicycle gear changing control apparatus in accordance with one embodiment.
Figure 3:
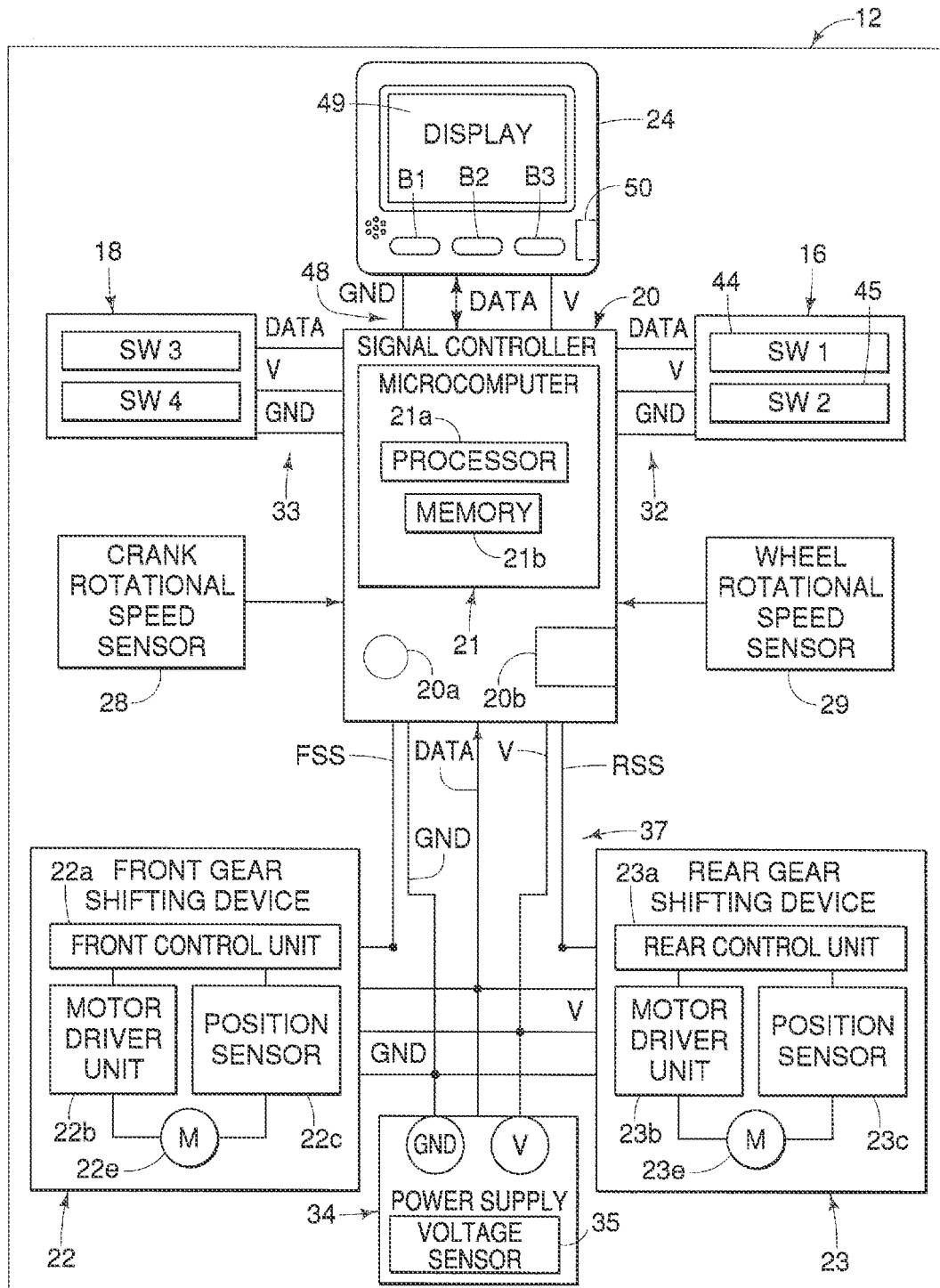
FIG. 3 is a schematic block diagram showing a system configuration that includes the bicycle gear changing control apparatus in accordance with one embodiment.

As seen in FIGS. 1 to 3, the gear changing control apparatus 12 is a part of an electric bicycle shift system. The gear changing control apparatus 12 includes a first shift operating device 16 and a second shift operating device 18. Also, the gear changing control apparatus 12 further includes a signal controller 20, a first gear changing device, namely, a front gear shifting device 22, a second gear changing device, namely, a rear gear shifting device 23, a cycling computer 24, a power supply 34, and a power supply sensor, namely, a voltage sensor 35. Also, the gear changing control apparatus 12 further includes a crank rotational speed sensor 28 and a wheel rotational speed sensor 29. The first shift operating device 16 and the second shift operating device 18 are examples of the upshifting input and/or the downshifting input of the gear changing control apparatus 12. The front gear shifting device 22 has a plurality of first shifting positions. The rear gear shifting device 23 has a plurality of second shifting positions. The crank rotational speed sensor 28 is configured to detect the cadence. The wheel rotational speed sensor 29 is configured to detect the speed of the bicycle 10.

As seen in FIGS. 1 and 2, the first shift operating device 16 and the second shift operating device 18 are installed on the curved portion of the drop-type handlebar. The first shift operating device 16 is fixed to the curved portion on the right side as viewed from the rear of the handlebar. The first shift operating device 16 has a first base member 40a fixed to the curved portion. A first brake lever 43a is mounted in a freely pivotal manner to the first base member 40a for applying the brakes, for example, the front brake 31 (or the rear brake 30). The first brake lever 43a is provided with a first shift operating member 44a and a second shift operating member 45a that are configured to pivot around an axis that is different from the pivot axis of the first brake lever 43a. The first shift operating member 44a is provided with a first electrical switch SW1 that can be pressed. The second shift operating member 45a is provided with a second electrical switch SW2 that can be pressed. The first shift operating device 16 is configured to operate the rear gear shifting device 23. The first brake lever 43a is mechanically connected to the front brake 31 via a brake cable.

The second shift operating device 18 is a member that is a mirror image of the first shift operating device 16. The second shift operating device 18 has a second base member 40b fixed to the left side as viewed from the rear of the handlebar. A second brake lever 43b is mounted in a pivotal manner to the second base member 40b for applying the brakes, for example, the rear brake 30. The second brake lever 43b is provided with a third shift operating member 44b and a fourth shift operating member 45b that are configured to pivot around an axis that is different from the pivot axis of the second brake lever 43b. The third gear shift operating member 44b is provided with a third electrical switch SW3 that can be pressed. The fourth shift operating member 45a is provided with a fourth electrical switch SW4 that can be pressed. The second shift operating device 18 is configured to operate the front gear shifting device 22. The second brake lever 43b of the second shift operating device 18 is mechanically connected to the rear brake 30 via a brake cable.

The first and second shift operating devices 16 and 18 are electrically connected to the signal controller 20 according to the electrical cables 32 and 33, respectively. Furthermore, the rear brake 30 and the front gear shifting device 22 can be connected to the first shift operating device 16 and the front brake 31 and the rear gear shifting device 23 to the second shift operating device 18.

The signal controller 20 is one example of the gear changing controller. The signal controller 20 is configured to operate the rear gear shifting device 23 and the front gear shifting device 22 in accordance with the shifting signal resulting from the operation of the first shift operating device 16 and the second shift operating device 18 or in accordance with the shifting signal complying with the speed. The signal controller 20 includes a microcomputer 21. The microcomputer 21 has a microprocessor 21a and a memory 21b. The microprocessor 21a and the memory 21b are configured to process the signals from the various sensors including the voltage sensor 35 and the components of the gear changing control apparatus 12. The signal controller 20 also includes a shift control program. The shift control program controls the operation of the front gear shifting device 22 and the rear gear shifting device 23 as discussed below. The shift control program is stored in the memory 21b. The memory 21b includes a ROM (Read Only Memory) device and a RAM (Random Access Memory) device. The signal controller 20 is electrically connected to the other components of the gear changing control apparatus 12 as schematically illustrated in FIG. 3. As is apparent from this disclosure, wireless communication may be used rather than wire communication to operatively couple the signal controller 20 to the other parts of the gear changing control apparatus 12.

The signal controller 20 interprets and executes instructions (based on the data, signals and commands) of the various programs and hardware to direct the operation of the gear changing control apparatus 12. The signal controller 20 is illustrated as a single separate unit in FIG. 3. However, the signal controller 20 could be a part of another component, or the signal controller 20 could be configured from a plurality of controllers installed on different parts.

In the present embodiment, the signal controller 20 is equipped with a mode button 20a that is configured to make a selection from two shifting modes, which are the manual shifting mode for shifting according to the operation of the first and second shift operating devices 16 and 18 and the automatic shifting mode for shifting according to the riding conditions of the bicycle, such as the cadence or the speed of the bicycle. The manual mode and the automatic mode respectively include both a synchro-shifting mode, which cooperatively controls the front gear shifting device 22 and the rear gear shifting device 23, and the non-synchro-shifting mode, which individually controls the front gear shifting device 22 and the rear gear shifting device 23. Therefore, the shifting modes of synchro-shifting mode and non-synchro-shifting mode can be alternatively selected according to the mode button 20a respectively in the shifting modes of the manual mode and the automatic mode; the front gear shifting device 22 and the rear gear shifting device 23 can be operated in the selected shifting mode. When the shifting mode is the synchro-shifting mode, the front gear shifting device 22 and the rear gear shifting device 23 are controlled by the signal controller 20 in order to pass along a prescribed shifting route as illustrated in FIG. 5. The prescribed shifting route includes at least some of the shifting positions of the plurality of first gear shifting positions of the front gear shifting device 22 and at least some of the shifting positions of the plurality of second gear shifting portions of the rear gear shifting device 23. Furthermore, the target gear ratio is essentially attained simultaneously in the synchro-shifting mode during manual shifting according to the operation of the first shift operating device 16 or the second shift operating device 18.

The first electrical switch SW1 and the third electrical switch SW3 at the time of the synchro-shifting mode in manual shifting are examples of the signal output for outputting the first signal. The third electrical switch SW2 and the fourth switch SW4 at the time of the non-synchro-shifting mode in manual shifting are examples of the signals output for outputting the second signal when a long press operation is performed.

The shifting mode can be changed by manipulating the operation buttons of the first and second shift operating devices 16 and 18 and the cycling computer 24 instead of manipulating the mode button 20a.

At the time of the manual shifting mode, the signal controller 20 outputs a signal for individually or cooperatively controlling the front gear shifting device 22 and the rear gear shifting device 23 to the front gear shifting device 22 and the rear gear shifting device 23 according to the signal output according to the manipulation of the first and second shift operating devices 16 and 18. At the time of the automatic shifting mode, the signal controller 20 outputs a signal for individually or cooperatively controlling the front gear shifting device 22 and the rear gear shifting device 23 to the front gear shifting device 22 and the rear gear shifting device 23 according to the speed signal calculated based on the output of the rotational speed sensor 29.

As illustrated in FIG. 1, the first gear changing device, namely, the front gear shifting device 22, includes a motorized front derailleur that has a plurality of first shifting positions (e.g., two or three shifting positions). The motorized front derailleur moves the chain 26 to any of the plurality of front sprockets 47 (e.g., two or three sprockets) having different tooth counts. As illustrated in FIG. 5, the present embodiment is designed such that, if the number of the front sprockets 47 is three, the tooth count in the front sprocket on the Low side with the smallest tooth count is 24; the tooth count in the front sprocket on the Top side with the largest tooth count is 42; and the tooth count in the middle (Mid) front sprocket is 32. The tooth count set here is one example, and the tooth count can be set optionally.

As illustrated in FIG. 3, identical to the conventional motorized derailleur, the front gear shifting device 22 includes a front control unit 22*a*, a motor drive unit 22*b*, a position sensor 22*c*, and a motor 22*e*. The front control unit 22*a* controls the motor drive unit 22*b* based on the shifting control signal that complies with the manipulation of the first shift operating devices 16 and the second shift operating devices 18 or the shifting control signal that complies with the speed (or cadence). The motor 22*e* moves the chain guide of the front gear shifting device 22 to the side that approaches or separates from the frame 27.

As illustrated in FIG. 1, the second gear changing device, namely, the rear gear shifting device 23, includes a motorized rear derailleur that has a plurality of second shifting positions (e.g., ten shifting positions). The motorized rear derailleur moves the chain 26 to any of the plurality of rear sprockets 46 (e.g., ten sprockets) having a different tooth count. As illustrated in FIG. 5, in the case the number of rear sprockets 46 is 10, the sprocket with the largest tooth count is 36; thereafter, the tooth count becomes sequentially smaller. In the present embodiment, for example, the tooth counts in the rear sprocket 46 are set at 36, 32, 28, 24, 21, 19, 17, 15, 13, and 12. Here, the names of the first to tenth rear sprockets are applied in sequence from the sprocket with the largest tooth count. The tooth counts that are set here are one example, and the tooth counts can be set optionally.

As illustrated in FIG. 3, identical to the conventional motorized derailleur, the rear gear shifting device 23 includes a rear control unit 23*a*, a motor drive unit 23*b*, a position sensor 23*c*, and a motor 23*e*. The rear control unit 23*a* controls the motor drive unit 23*b* based on the shifting control signal that complies with the manipulation of the first shift operating devices 16 and the second shift operating devices 18 or the shifting control signal that complies with the speed (or cadence). The motor 23*e* moves the chain guide of the rear gear shifting device 23 to the side that approaches or separates from the frame 27.

Figure 4:
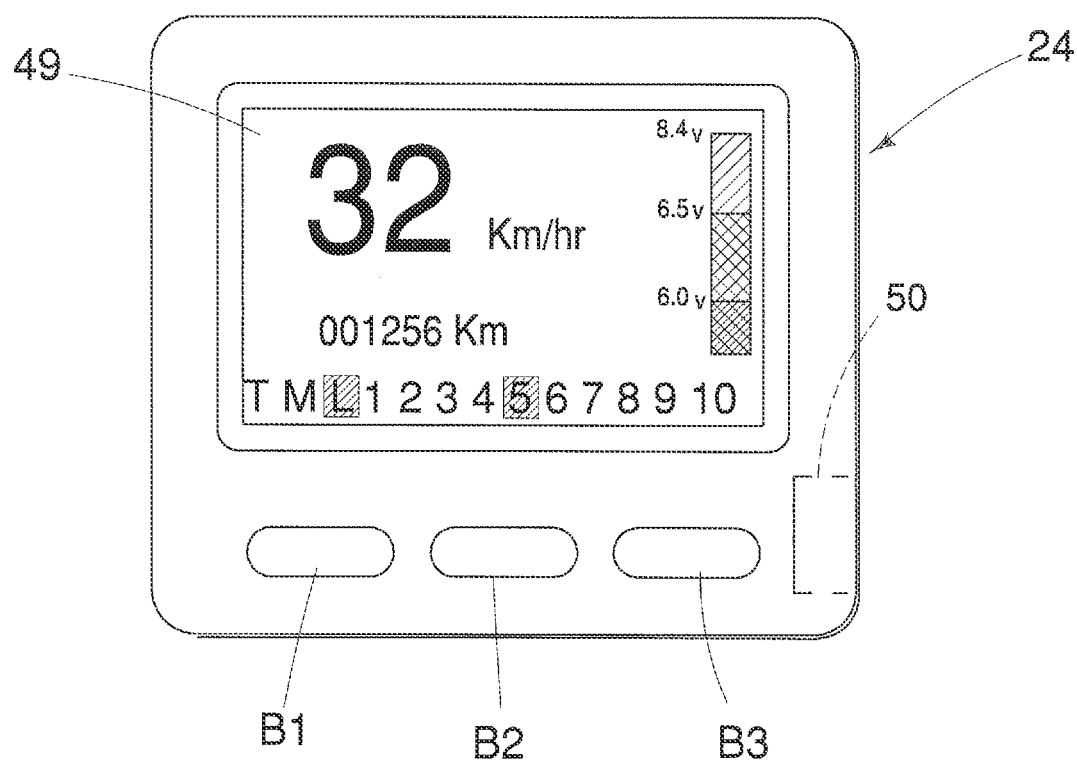
FIG. 4 is an enlarged top view of a display shown as an example of the notification unit.

The cycling computer 24 includes a microprocessor and a memory. The cycling computer 24 is electrically connected to the signal controller 20 by an electrical cable 48 as illustrated in FIG. 3. Accordingly, various data (the speed, cadence, shifting position, or the like) can be received from the other components. The cycling computer 24 has a liquid crystal display 49. As illustrated in FIG. 4, the speed, the cadence, the riding distance, the shifting positions of the front shifting device 22 and the rear gear shifting device 23, as well as the power level of the power supply 34, can be displayed on the liquid crystal display 49. The power level of the power supply 34 is displayed, for example, in three gradational areas that are divided by the first power level (e.g., 6.5 volts) and the second power level (e.g., 6.0 volts), wherein the power level is lower than the first power level. In the case of a color display, for example, the area that is lower than the second power level is displayed in red; the area between the first power level and the second power level is orange; and the area higher than the first power level is green. Namely, each area is displayed with a different color. Also, in the case of a monochromatic display, the concentration of the three areas can be varied. The power level is displayed, for example, with a bar graph on the right side of the liquid crystal display 49. The illustration in FIG. 4 shows a state wherein the power supply 34 has been fully charged and the difference in the color is expressed by shading with diagonal lines. Three operation buttons B1, B2, and B3 are provided at the bottom part of the liquid crystal display 49. The liquid crystal display 49 is one example of the notification unit for providing information that the power level detected by the voltage sensor 35 is lower than the first power level (e.g., 6.5 volts). Also, the cycling computer 24 has an input/output port 50. The input/output port 50 is configured with, for example, an USB (Universal Serial Bus) port.

The power supply 34 is provided, for example, to the frame 27 of the bicycle 10. The power supply 34 includes, for example, an electric storage element such as a rechargeable secondary battery, a large capacity condenser, or the like. In the present embodiment, the power supply 34 is a secondary battery such as a rechargeable lithium ion battery, a nickel hydrogen battery, or the like. The maximum voltage of the power supply 34 is, for example, 8.4 volts. The power supply 34 supplies power to the components of the gear shift control device 12, such as the first gear shift operating device 16, the second gear shift operating device 18, the signal controller 20, the front gear shifting device 22, the rear gear shifting device 23 and the cycling computer 24.

The voltage sensor 35 detects the voltage, which is the power level, of the power supply 34. The signal controller 20 changes the shifting control according to the power level detected by the voltage sensor 35. Specifically, the signal controller 20 controls at least one of the front gear shifting device 22 and the rear gear shifting device 23 in order to pass along a prescribed shifting route that includes at least one of the plurality of first shifting positions and at least one of the plurality of second shifting positions when the power level of the power supply 34 is higher than the first power level (e.g., 6.5 volts) at the time of the synchro-shifting mode, and a first signal is output from the signal output (the first electrical switch SW1 or the third electrical switch SW3).

The signal controller 20 controls at least one of the front gear shifting device 22 and the rear gear shifting device 23 in order to pass along one portion of a prescribed shifting route when the third electrical switch SW3 and the fourth electrical switch SW4 are pressed for a long time, and a second signal is output. In the present embodiment, the front gear shifting device 22 is applied with an upshifting or downshifting control.

The signal controller 20 controls the front gear shifting device 22 such that the plurality of first shifting positions are changed to the front sprocket side that has a small tooth count at the time of the non-synchro-shifting mode; or, when the power level detected by the voltage sensor 35 is lower than the first power level, the fourth electrical switch SW4 is operated, and a third signal is output.

The signal controller 20 controls the rear gear shifting device 23 such that the plurality of second shifting positions are sequentially changed to one of the shifting directions (e.g., the downshifting direction) at the time of the non-synchro-shifting mode or when the power level detected by the voltage sensor 35 is lower than the first power level, and a fourth signal is output from the second electrical switch SW2.

The signal controller 20 controls the rear gear shifting device 23 such that the plurality of second shifting positions are sequentially changed to the other shifting direction (e.g., the upshifting direction) when a fifth signal is output from the first electrical switch SW1 at the time of the non-synchro-shifting mode.

As illustrated in FIGS. 2 and 3, the electrical cable 37 connects the power supply 34 and the signal controller 20. Accordingly, power is supplied to the signal controller 20. Also, power is supplied to the first gear shift operating device 16, the second gear shift operating device 18, and the cycling computer 24 via the signal controller 20. The electrical cable 37 transmits shifting signals (FSS, RSS) and shifting position signals (DATA) between the signal controller 29 and the front gear shifting device 22 and the rear gear shifting device 23. The electrical cables 32, 33 and 37 are double conductor cables. In the present embodiment, each of the signal controller 20, the front gear shifting device 22 and the rear gear shifting device 23 includes s PLC (Power Line Communication) circuit board.

In the present embodiment, a front gear shifting device 22 having two or three first shifting positions and a rear gear shifting device 23 having ten second shifting positions are combined. Therefore, a maximum gear ratio of 30 can be attained. However, one portion of this total gear ratio is used in the synchro-shifting mode. For example, a case wherein the number of front sprockets is three and there are ten rear sprockets is shown in the shift table of the synchro-shifting mode illustrated in FIG. 5. Here, the rider can perform a gear shifting operation along a prescribed shifting route just by operating, for example, the first shift operating member 44a for upshifting and the third shift operating member 44b for downshifting. Referring to the shifting route illustrated in FIG. 5, shifting is possible from the first stage to the fourteenth stage from the minimum gear ratio 0.67 to the maximum gear ratio 3.82. Here, in the syncro-shifting mode, shifting is performed such that the gear ratio changes at the same interval as much as possible. In FIGS. 5 to 7, the rear sprocket assembly is described as CS, and the front sprocket assembly as FC.

Next, three shifting routes in the synchro-shifting mode will be described. In the present embodiment, the shifting route illustrated in FIG. 5 is employed.

Referring to FIG. 5, in the case of the upshifting operation performed with the first shift operating member 44a at the time of the synchro-shifting mode, at the first to the fifth stages, upshifting is performed by shifting the rear gear shifting device 23 from the first rear sprocket to the fifth rear sprocket. In the sixth stage, the front sprocket 47 is upshifted from Low to Mid; furthermore, the rear sprocket 46 is downshifted from the fifth rear sprocket to the fourth rear sprocket. At this time, the rear gear shifting device 23 is downshifted. However, the gear ratio of the sixth stage is greater than that of the fifth stage. From the sixth stage to the ninth stage, the rear gear shifting device 23 is upshifted from the fourth rear sprocket to the seventh rear sprocket. When the rear gear shifting device is upshifted to the ninth stage, the front gear shifting device 22 is upshifted from Mid to Top in the tenth stage, as well as when downshifting the rear gear shifting device 23 from the seventh rear sprocket to the sixth rear sprocket. However, even in this case, the gear ratio in the tenth stage is greater than the gear ratio in the ninth stage. From the eleventh stage to the fourteenth stage, the rear gear shifting device 23 is upshifted from the sixth rear sprocket to the tenth rear sprocket.

On the other hand, in a downshift operation using the third shift operating member 44b, a shifting route that is different from the upshift operation is set. However, the number of stages is 14, which is the same as in the upshift operation.

In the case of a downshift operation performed with the third shift operating member 44b at the time of the synchro-shifting mode, from the fourteenth to the sixth stage, downshifting is performed by downshifting the rear gear shifting device 23 from the tenth rear sprocket to the second rear sprocket. In the fifth stage, the front sprocket 47 is downshifted from Top to Mid; furthermore, the rear sprocket 46 is upshifted from the second rear sprocket to the third rear sprocket. At this time, the rear gear shifting device 23 is upshifted. However, the gear ratio in the fifth stage is less than that in the sixth stage. From the fifth stage to the third stage, the rear gear shifting device 23 is downshifted from the third rear sprocket to the first rear sprocket. When the rear gear shifting device is downshifted to the third stage, the front gear shifting device 22 is downshifted from Mid to Low in the second stage, as well as when upshifting the rear gear shifting device 23 from the first rear sprocket to the second rear sprocket. However, even in this case, the gear ratio in the second stage is less than the gear ratio in the third stage. When downshifting from the second stage to the first stage, the rear gear shifting device 23 is downshifted from the second rear sprocket to the first rear sprocket. Accordingly, concentrated use of specific sprockets is avoided, and the wearing of the sprockets can be prevented in the synchro-shifting mode. In the synchro-shifting mode, the gear ratio indicated by being shaded with diagonal lines is not normally used. However, the gear ratio can be selected as indicated with the white arrows by pressing the third shift operating member 44b and the fourth shift operating member 45b for a long time. However, a combination wherein the chain 26 crosses most often, namely, the combination of the Top front sprocket and the first rear sprocket, and the combination of the Low front sprocket and the tenth rear sprocket are allowed in the non-synchro-shifting mode but are inhibited in the synchro-shifting mode.

Also, in another shifting route illustrated in FIG. 6, simultaneous shifting of the front gear shifting device 22 and the rear gear shifting device 23 is avoided during a stage change.

Referring to FIG. 6, in the case of upshifting with the first shift operating member 44a at the time of the synchro-shifting mode, from the first to the fifth stage, the upshift operation is performed by upshifting the rear gear shifting device 23 from the first rear sprocket to the fifth rear sprocket, which is identical to the shifting route illustrated in FIG. 5. The front sprocket 47 is upshifted from Low to Mid. Therefore, when the upshift operation is performed from the fifth stage to the sixth stage, the change in the gear ratio is greater than that of the shifting route illustrated in FIG. 5. From the sixth stage to the eighth stage, the rear gear shifting device 23 is upshifted from the fifth rear sprocket to the seventh rear sprocket. In the ninth stage, the front gear shifting device 22 is upshifted from Mid to Top. From the ninth stage to the twelfth stage, the rear gear shifting device 23 is upshifted from the seventh rear sprocket to the tenth rear sprocket. In this case, there are two stages less than in the shifting route illustrated in FIG. 5.

On the other hand, in a downshifting operation using the third shift operating member 44b, a shifting route that is different from upshifting is set. However, the number of stages is 12 and is identical to the upshifting operation. In the case of downshifting, from the twelfth stage to the fourth stage, the downshift operation is performed by downshifting the rear gear shifting device 23 from the tenth rear sprocket to the second rear sprocket. In the third stage, the front sprocket 47 is downshifted from Top to Mid. From the third stage to the second stage, the rear gear shifting device 23 is downshifted from the second rear sprocket to the first rear sprocket. When performing a downshifting operation to the second stage, the front gear shifting device 22 is downshifted from Mid to Low in the first stage. Accordingly, the concentrated use of specific sprockets is avoided, and wearing of the sprockets can be prevented in the synchro-shifting mode.

Referring to FIG. 7, instead of three front sprockets, the number of the front sprockets 47 is two, and they are Top and Low. The number of the rear sprockets 46 is ten, which is identical to those depicted in FIGS. 5 and 6. Also, the tooth count of the Top front sprocket is 38.

Referring to FIG. 7, when an upshifting operation is performed with the first shift operating member 44a at the time of the synchro-shifting mode, from the first to the third stage, the upshifting operation is performed by upshifting the rear gear shifting device 23 from the first rear sprocket to the third rear sprocket. In the fourth stage, the front sprocket 47 is upshifted from Low to Top. Furthermore, the rear sprocket 46 is downshifted from the third rear sprocket to the second rear sprocket. At this time, the rear gear shifting device 23 is downshifted. However, the gear ratio in the fourth stage is greater than that of the third stage. From the fourth stage to the twelfth stage, the rear gear shifting device 23 is upshifted from the second rear sprocket to the tenth rear sprocket.

On the other hand, in a downshift operation using the third shift operating member 44b, a shifting route that is different from the upshift operation is set. However, the number of stages is 12 and is identical to that at the time of an upshifting operation.

In the case of a downshift operation performed with the third shift operating member 44b, from the twelfth stage to the third stage, the rear gear shifting device 23 is downshifted from the tenth rear sprocket to the first rear sprocket. In the second stage, the front sprocket 47 is downshifted from Top to Low. Furthermore, the rear sprocket 46 is upshifted up from the first rear sprocket to the second rear sprocket. At this time, the rear gear shifting device 23 is upshifted. However, the gear ratio of the second stage is less than that of the third stage. From the second stage to the first stage, the rear gear shifting device 23 is downshifted from the second rear sprocket to the first rear sprocket Next, the specific control procedure of the signal controller 20 will be described based on the flow charts illustrated in FIGS. 8 to 10.

In the description provided below, the synchro-shifting mode and non-synchro-shifting mode for the manual shifting mode will be described, and the description for the automatic shifting mode will be omitted since the same control as in the manual shifting mode is performed, except for the signal controller 20, rather than the shift operating member outputting the shifting signals according to changes in the riding condition.

Here, the flags used in the flow charts will be described in advance. The flag SF is for determining whether or not the mode is the synchro-shifting mode; when (SF←1) is set, the mode is the synchro-shifting mode; when (SF←0) is set, the mode is the non -synchro-shifting mode. Also, the flag VF1 is the flag that indicates that the voltage of the power supply 34 has become lower than the first power level (6.5 volts) and has become higher than the second power level (6.0 volts). The flag VF2 is the flag that indicates that the voltage of the power supply 34 has become lower than the second power level (6.0 volts). When the voltage of the power supply 34 becomes lower than 6.5 volts, the operation of a portion of the front gear shifting device 22 is inhibited.

When the voltage of the power supply 34 becomes lower than 6.0 volts, the operation of the front gear shifting device 22 and the rear gear shifting device 23 is inhibited.

Figure 8:
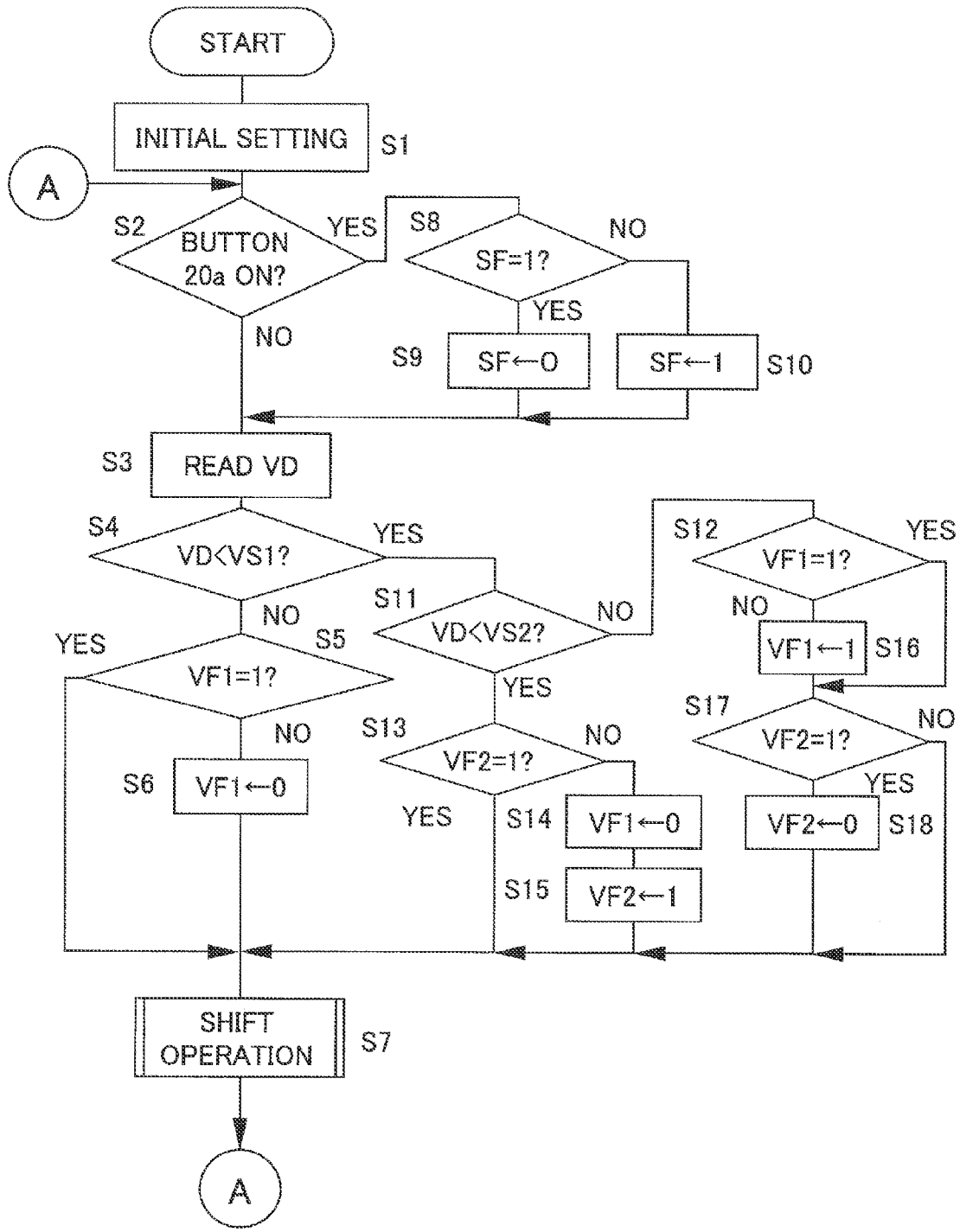
FIG. 8 is a flow chart that illustrates one example of an operation of the gear changing controller.

Referring to FIG. 8, when the power is input to the signal controller 20, an initial setting is carried out in Step S1. In the initial setting, the various flags are reset, and the non-synchro-shifting mode for the manual shifting mode is set. In Step S2, the signal controller 20 makes a determination regarding whether or not the mode button 20a had been pushed. In the case in which the mode button 20a has not been pushed, the process moves to Step S3. In Step S3, the signal controller 20 reads the voltage VD of the power supply 34 from the output of the voltage sensor 35. In Step S4, the signal controller 20 makes a determination regarding whether or not the read voltage VD is lower than the first power level VS1. If the read voltage VD is higher than the first power level VS1, the process moves to Step S5. In Step S5, the signal controller 20 makes a determination regarding whether or not the flag VF1 has been set. If the flag VF1 has been set, the process moves to Step S6, and the signal controller 20 resets (=VF1←0) the flag VF1. In Step S7, the signal controller 20 performs the shift operation process illustrated in FIGS. 9 and 10 and returns to Step S2.

When the mode button 20a is pushed, the process moves to Step S8 from Step S2. In Step S8, the signal controller 20 makes a determination regarding whether or not the shifting mode is the synchro-shifting mode. The signal controller 20 makes a determination regarding whether or not the shifting mode is the synchro-shifting mode from whether or not the flag SF has been set (SF=1). If the mode is the synchro-shifting mode, the process moves to Step S9, the signal controller 20 resets (SF←0) the flag SF, and the process moves to Step S3. If the mode is not the synchro-shifting mode, the process moves from Step S8 to Step S10, the signal controller 20 sets the flag SF, and the process moves to Step S3.

If the voltage VD of the power supply 34 is lower than the first power level VS1, namely, the voltage VD is less than the first power level VS1, the process moves from Step S4 to Step S11. In Step S11, the signal controller 20 makes a determination regarding whether or not the voltage VD is lower than the second power level VS2. If the signal controller 20 makes a determination that the voltage VD is not lower than the second power level VS2, the process moves from Step S11 to Step S12. In Step S12, the signal controller 20 makes a determination regarding whether or not the flag VF1 has already been set.

When a determination is made that the voltage VD is lower than the second power level VS2, the process moves from Step S11 to Step S13. In Step S13, the signal controller 20 makes a determination regarding whether or not the flag VF2 has already been set. If the flag VF2 has already been set, then the process moves to Step S7. If the flag VF2 has not been set, the process moves from Step S13 to Step S14. In Step S14, the signal controller 20 resets the flag VF1. In Step S15, the signal controller 20 sets (VF2←1) the flag VF2, and the process moves to Step S7.

If the flag VF1 has not already been set, the process moves from Step S12 to Step S16. In Step S16, the signal controller 20 sets (VF1←1) the flag VF1, and the process moves to Step S17. If the flag VF1 has already been set, then the process skips Step S16 and moves to Step S17. In Step S17, the signal controller 20 makes a determination regarding whether or not the flag VF2 has already been set. If the flag VF2 has been set, the process moves from Step S17 to Step S18, the signal controller 20 resets (VF2←0) the flag VF2, and the process moves to Step S7. If the flag VF2 has not been set, then the process skips Step S18 and moves to Step S7.

Figure 9:
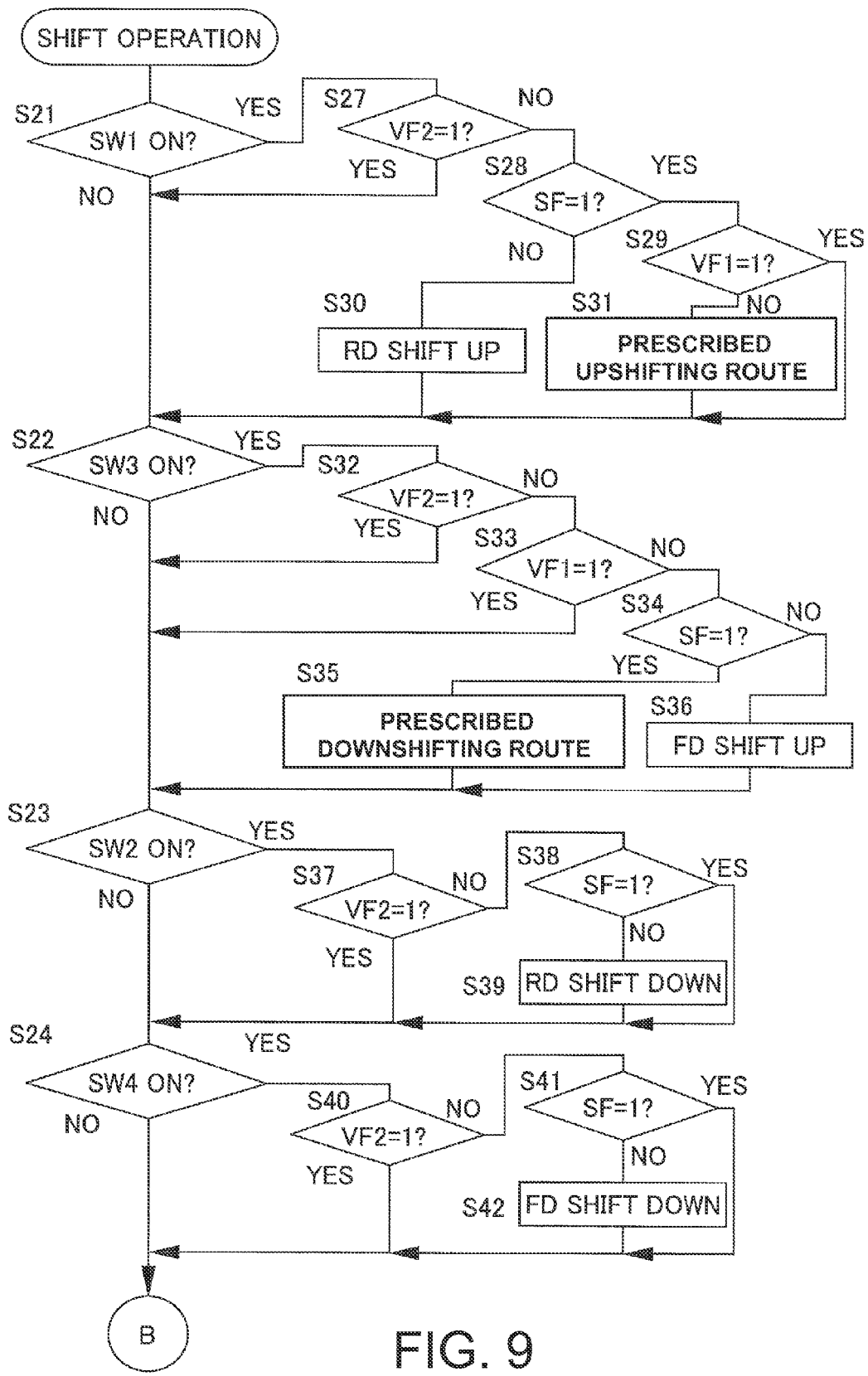
FIG. 9 is a first part of a flow chart that illustrates one example of a control at the time of a shifting operation.
Figure 10:
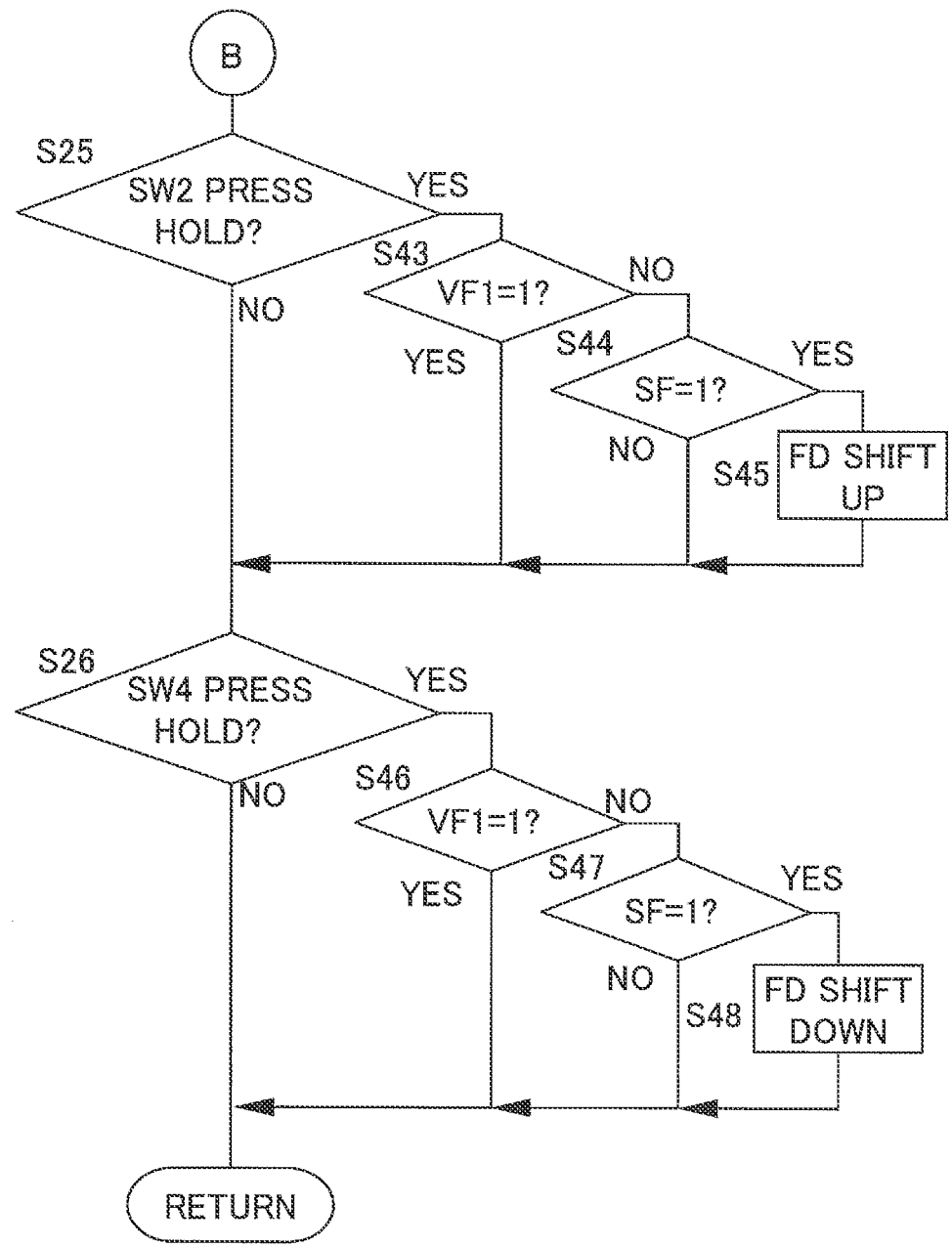
FIG. 10 is a second part of a flow chart that illustrates one example of a control at the time of a shifting operation.

In the shifting process illustrated in FIGS. 9 and 10, the signal controller 20 makes a determination regarding whether or not the first shift operating member 44a has been operated and whether the first electrical switch SW1 has been turned ON in Step S21 of FIG. 9. If the signal controller 20 makes a determination that the first electrical switch SW1 has not been turned ON, then the process moves to Step S22. In Step S22, the signal controller 20 makes a determination regarding whether or not the third shift operating member 44b has been operated and whether the third electrical switch SW3 has been turned ON. If the signal controller 20 makes a determination that the third electrical switch SW3 has not been turned ON, then the process moves to Step S23. In Step S23, the signal controller 20 makes a determination regarding whether or not the second shift operating member 45a has been operated and whether the second electrical switch SW2 has been turned ON. If the signal controller 20 makes a determination that the second electrical switch SW2 has not been turned ON, the process moves to Step S24. In Step S24, the signal controller 20 makes a determination regarding whether or not the fourth shift operating member 45b has been operated and whether the fourth electrical switch SW4 has been turned ON. If the signal controller 20 makes a determination that the fourth electrical switch SW4 has not been turned ON, then the process moves to Step S25 in FIG. 10. In Step S25, the signal controller 20 makes a determination regarding whether or not the second shift operating member 45a has been applied with a long pressing operation and whether the second electrical switch SW2 is in the long pressing state. The long pressing operation of the second shift operating member 45a is used for upshifting the front gear shifting device 22 at the middle of the shifting route during the synchro-shifting mode. Accordingly, upshifting can be performed quickly by a shortcut that passes along only a portion of the shifting route. If the signal controller 20 makes a determination that the second electrical switch SW2 is not in the long pressing state, then the process moves to Step S26. In Step S26, the signal controller 20 makes a determination regarding whether or not the fourth shift operating member 45b has been applied with the long pressing operation and whether the fourth electrical switch SW4 is in the long pressing state. The long pressing operation of the fourth shift operating member 45b is used for downshifting the front gear shifting device 22 at the middle of the shifting route at the time of the synchro-shifting mode. Accordingly, downshifting can be performed quickly by a shortcut that passes along only a portion of the shifting route. If a determination is made that the fourth electrical switch SW4 is not in the long pressing state, the process moves to Step S2 illustrated in FIG. 8 by escaping from the shift operation process.

If a determination is made that the first shift operating member 44a has been operated and that the first electrical switch SW1 has been turned ON, then the process moves from Step S21 to Step S27. In Step S27, the signal controller 20 makes a determination regarding whether or not the flag VF2 has been set. Namely, a determination is made regarding whether or not the voltage VD of the power supply 34 is lower than the second power level VS2. If the flag VF2 has been set, then the process moves to Step S22. If the flag VF2 has been reset, the process moves from Step S27 to Step S28. In Step S28, the signal controller 20 makes a determination regarding whether or not the flag SF has been set. Namely, a determination is made regarding whether or not the mode is the synchro-shifting mode. If the flag SF has been set, then the process moves to Step S29, and the signal controller 20 makes a determination regarding whether or not the flag VF1 has been set. Namely, a determination is made regarding whether or not the voltage VD of the power supply 34 is lower than the first power level VS1 and is higher than the second power level VS2. If the flag SF has not been set, then the process moves from Step S28 to Step S30. In Step S30, the signal controller 20 upshifts the rear gear shifting device 23 by one stage from the current shifting position, and the process moves to Step S22. If the chain 26 is in the tenth rear sprocket illustrated in FIG. 5, then this process is ignored since further upshifting is not possible. If flag VF1 has been set, then the process moves from Step S29 to Step S22. If the flag VF1 has not been set, namely, then the voltage VD of the power supply 34 is higher than the first power level VS1, the signal controller 20 upshifts by one stage along a prescribed shifting route, and the process moves to Step S22. Furthermore, when the mode is the non-synchro-shifting mode, the rear gear shifting device 23 can be upshifted if the voltage VD of the power supply 34 is higher than the second power level VS2.

If a determination is made that the third shift operating member 44b has been operated and that the third electrical switch SW3 has been turned ON, the process moves from Step S22 to Step S32. In Step S32, the signal controller 20 makes a determination regarding whether or not the flag VF2 has been set. Namely, a judgment is made on whether or not the voltage VD of the power supply 34 is lower than the second power level VS2. If the flag VF2 has been set, then the process moves to Step S23. If the flag VF2 has been reset, then the process moves from Step S32 to Step S33. In Step S33, the signal controller 20 makes a determination regarding whether or not the flag VF1 has been set. Namely, a determination is made regarding whether or not the voltage VD of the power supply 34 is lower than the first power level VS1 and is higher than the second power level VS2. If the flag VF1 has been set, then the process moves to Step S23. Upshifting the front gear shifting device 22 requires greater power than upshifting the rear gear shifting device 23. Therefore, if the voltage VD of the power supply 34 becomes lower than the first power level, upshifting the front gear shifting device 22 is inhibited in the non-synchro-shifting mode. However, as shown in Step S42 discussed below, downshifting the front gear shifting device 22 is allowed in the non-synchro-shifting mode even when the voltage VD of the power supply 34 is lower than the first power level VS1. If the flag VF1 has not been set, then the process moves from Step S33 to Step S34. In Step S34, the signal controller 20 makes a determination regarding whether or not the flag SF has been set, namely, whether or not the mode is the synchro-shifting mode. If the flag SF has been set, then the process moves from Step S34 to Step S35. In Step S35, the signal controller 20 downshifts by one stage along a prescribed shifting route, and the process moves to Step S23. If the synchro-shifting mode has not been set, the process moves from Step S34 to Step S36. In Step S36, the signal controller 20 upshifts the front gear shifting device 22 by one stage from the current position in order to shift in the non-synchro-shifting mode, and the process moves to Step S23. If the chain 26 is in the Top sprocket illustrated in FIG. 5, further upshifting is not possible, and this process is ignored.

If a determination is made that the second shift operating member 45a has been operated and that the second electrical switch SW2 has been turned ON (which varies based on the long pressing state discussed below), the process moves from Step S23 to Step S37. In Step S37, the signal controller 20 makes a determination regarding whether or not the flag VF2 has been set, namely, whether or not the voltage VD is lower than the second power level. If a determination is made that the flag VF2 has been set and the voltage VD is lower than the second power level, the process moves to Step S24. If the flag VF2 has been reset, the process moves from Step S37 to Step S38. In Step S38, a determination is made regarding whether or not the flag SF has been set. Only the long pressing state to be discussed below is effective for the second shift operating member 45a at the time of the synchro-shifting mode. Therefore, the process moves to Step S24 when the flag SF has been set. When the flag SF has been reset (namely, in the non-synchro-shifting mode), the process moves from Step S38 to Step S39, the rear gear shifting device 23 is downshifted by one stage, and the process moves to Step S24. Namely, when the mode is the non-synchro-shifting mode, the rear gear shifting device 23 can be downshifted even if the voltage VD of the power supply 34 is lower than the first power level VS1 as long as the voltage is higher than the second power level VS2. If the chain 26 is in the first rear sprocket at this time, further downshifting is not possible, and this process is ignored.

If a determination is made that the fourth shift operating member 45b has been operated and that the fourth electrical switch SW4 has been turned ON (which varies based on the long pressing state discussed below), the process moves from Step S24 to Step S40. In Step S40, the signal controller 20 makes a determination regarding whether or not the flag VF2 has been set, namely, whether or not the voltage VD is lower than the second power level. If a determination is made that the flag VF2 has been set, the process moves to Step S25 illustrated in FIG. 10. If the flag VF2 has been reset, the process moves from Step S40 to Step S41. In Step S41, a determination is made regarding whether or not the flag SF has been set. Only the long pressing state to be described below is effective for the fourth shift operating member 45b at the time of the synchro -shifting mode. Therefore, the process moves to Step S25 without performing any process when the flag SF has been set. When the flag SF has been reset (namely, in the non-synchro -shifting mode), the process moves from Step S41 to Step S42, the front gear shifting device 22 is downshifted by one stage, and the process moves to Step S25. Namely, when the mode is the non-synchro-shifting mode, the front gear shifting device 22 can be downshifted even if the voltage VD of the power supply 34 is lower than the first power level VS1 as long as the voltage is higher than the second power level VS2. If the chain 26 is in the Low front sprocket at this time, further downshifting is not possible, and this process is ignored.

As described above, when in the non-synchro-shifting mode, the downshifting and upshifting operations of the rear gear shifting device 23 and the downshifting operation of the front gear shifting device 22 can be performed even if the voltage VD becomes lower than the first power level VS1.

If a determination is made that a long press operation has been applied to the second shift operating member 45ab and that the second electrical switch SW2 is in the long pressing state, the process moves from Step S25 to Step S43. In Step S43, the signal controller 20 makes a determination regarding whether or not the flag VF1 has been set. Namely, a determination is made regarding whether or not the voltage VD of the power supply 34 is lower than the first power level VS1 and is higher than the second power level VS2. If the flag VF1 has been set, the process moves to Step S26. If the flag VF1 has not been set, the process moves from Step S43 to Step S44. In Step S44, the signal controller 20 makes a determination regarding whether or not the flag SF has been set, namely, whether or not the synchro-shifting mode has been set. The long pressing operation of the third shift operating member 45a is for short cutting the shifting in the upshift direction at the time of the synchro-shifting mode. Therefore, the process moves to Step S26 if the mode is not the synchro-shifting mode. When the mode is the synchro-shifting mode, the process moves from Step S44 to Step S45, the front gear shifting device 22 is upshifted by one stage, and the process moves to Step S26. Accordingly, an upshifting operation that greatly changed the gear ratio at the middle of a prescribed shifting route can be performed quickly. If the chain is already in the Top front sprocket, this process is ignored.

For example, in the shifting route illustrated in FIG. 5, if a long pressing operation is applied to the second shift operating member 45a when the front sprocket is Low and the chain 26 is hooked to the third rear sprocket, the front gear shifting device 22 is upshifted from Low to Mid as indicated with the arrow. Accordingly, the gear ratio suddenly changes from 0.86 to 1.14.

If a determination is made that a long pressing operation has been applied to the fourth shift operating member 45b and that the fourth electrical switch SW4 is in the long pressing state, the process moves from Step S26 to Step S46. In Step S46, a determination is made regarding whether or not the flag VF1 has been set. Namely, a determination is made regarding whether or not the voltage VD of the power supply 34 is lower than the first power level VS1. If the flag VF1 has been set, the process moves to Step S2. If the flag VF1 has been set, the process moves from Step S46 to Step S47. In Step S47, the signal controller 20 makes a determination regarding whether or not the flag SF has been set, namely, whether or not the synchro-shifting mode has been set. The long pressing operation of the fourth shift operating member 45b is for short cutting the shifting in the downshifting direction at the time of the synchro-shifting mode. Therefore, the process moves to Step S2 if the mode is not the synchro-shifting mode. When in the synchro-shifting mode, the process moves from Step S47 to Step S48, and the front gear shifting device 22 is downshifted by one stage. Accordingly, a downshifting operation that greatly changed the gear ratio at the middle of a prescribed shifting route can be performed quickly. If the chain is already in the Low front sprocket, this process is ignored.

For example, in the shifting route illustrated in FIG. 5, if a long pressing operation is applied to the fourth shift operating member 45b when the front sprocket is the Top sprocket and the chain 26 is hooked to the fifth rear sprocket, the front gear shifting device 22 is downshifted from Top to Mid as indicated with the arrow. Accordingly, the gear ratio suddenly changes from 2.00 to 1.52.

In the present embodiment, the upshifting operation and the downshifting operation of the rear gear shifting device 23 and the downshifting operation of the front gear shifting device 22 can be performed even if the voltage VD of the power supply 34 becomes lower than the first power level VF1. Therefore, the rider convenience can be improved even if the voltage VD of the power supply 34 decreases.

Other Embodiments

While embodiments of the present invention were described above, the present invention is not limited to the above-mentioned embodiments, and various modifications are possible in a scope that does not deviating from the spirit of the invention. In particular, the plurality of embodiments and modifications described in the specifications can be optionally combined according to necessity.

Figure 11:
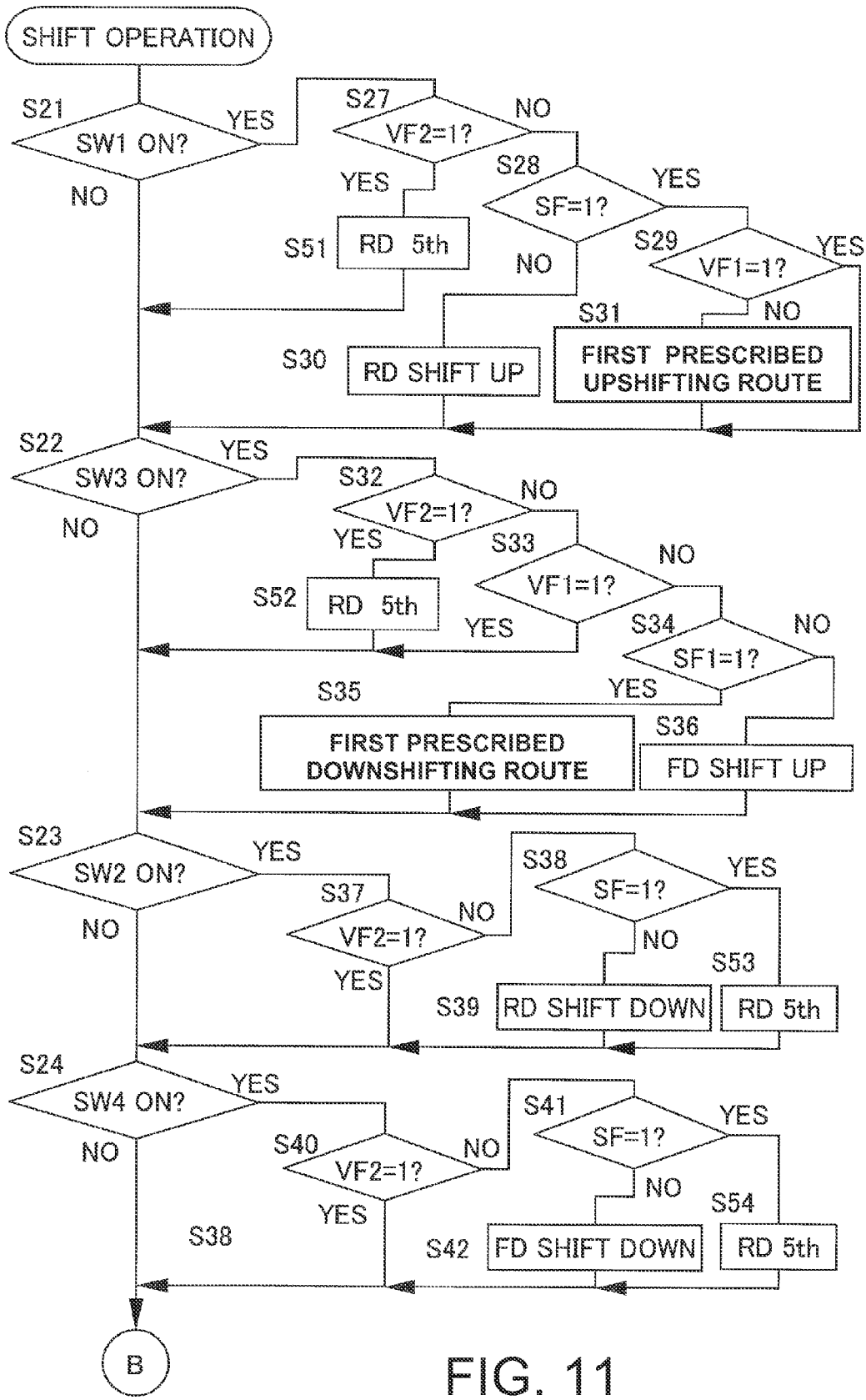
FIG. 11 is a diagram corresponding to FIG. 9 that illustrates the control at the time of a shifting operation in a modified example.

(a) In the above-mentioned embodiments, the shifting operation in the nonsynchro-shifting mode is inhibited when the voltage VD of the power supply 34 becomes lower than the second power level VS2. In the modification illustrated in FIG. 11, the signal controller 20 performs shifting to a prescribed second shifting position (e.g., the fifth rear sprocket) of the rear gear shifting device 23 when the voltage VD of the power supply 34 becomes lower than the second power level VS2 in Step S51, Step S52, Step S53, and Step S54. Accordingly, even if the power supply 34 has been consumed and the shifting operation is inhibited, avoiding a situation of needing to ride the bicycle at a very high or low gear ratio is possible.

(b) In the above-mentioned embodiments, the present invention was described by using a drop handle-type bicycle as an example. However, the present invention is not limited to this type of bicycle. For example, the present invention can be applied to the gear changing control apparatus equipped in mountain bikes.

(c) In the above-mentioned embodiments, the first shift operating member and the second shift operating member are provided to the brake lever. However, the first shift operating member and the second shift operating member cam be provided to the handlebar so as to be separate from the brake lever.

(d) In the above-mentioned embodiments, a liquid crystal display was shown as an example of the notification unit for providing information that the voltage VD of the power supply 34 is lower than the first power level. However, the notification unit is not limited to a liquid crystal display. For example, providing this information by changing the number of emissions from a plurality of light emitting diodes, by changing the color of one of the light emitting diodes, with a buzzer sound, with the sound and vibrations, or the like is also possible. Additionally, providing this information by combining the display and sounds is possible.

(e) In the above-mentioned embodiments, the downshifting operation of the front gear shifting device 22 is performed in the non-synchro-shifting mode when the voltage VD is higher than the second power level VS2 in Step S42 of FIG. 9. However, the present invention is not limited to this. For example, allowing only the downshift operation from the Top sprocket to the Mid sprocket of the front gear shifting device 22 and inhibiting the downshifting operation from the Mid sprocket to the Low sprocket are possible. Accordingly, even if the voltage VD becomes low, the gear ratio is not made too small, and the rider convenience is further improved.

While only selected embodiments have been chosen to illustrate the present invention, it will be apparent to those skilled in the art from this disclosure that various changes and modifications can be made herein without departing from the scope of the invention as defined in the appended claims. Thus, the foregoing descriptions of the embodiments according to the present invention are provided for illustration only, and not for the purpose of limiting the invention as defined by the appended claims and their equivalents.

What is claimed is:

1. A bicycle control apparatus comprising:
a first gear changing device having a plurality of first shifting positions;
a second gear changing device having a plurality of second shifting positions;
a power supply sensor that detects a power level of a power supply configured to supply power to at least one of the first and second gear changing devices; and
a gear shift controller programmed to cooperatively control the first and second gear changing devices, the gear shift controller being further programmed to individually control
the first and second gear changing devices upon the power level being detected by the power supply sensor being lower than a first power level,
the gear shift controller programed to cooperatively control the first and second gear changing devices along a prescribed shifting route including at least one of the plurality of first shifting positions and at least one of the plurality of second shifting positions upon the power level detected by the power supply sensor being higher than the first power level.

2. The bicycle control apparatus according to claim 1, wherein
the first gear changing device includes a front derailleur for moving a chain to any of a plurality of front sprockets having different tooth counts, and
the gear shift controller is further programmed to at least partially inhibit the front derailleur from shifting in a direction toward a front sprocket side having a large tooth count when the power level detected by the power supply sensor is lower than the first power level.

3. The bicycle control apparatus according to claim 2, wherein
the second gear changing device includes a rear derailleur for moving a chain to any of a plurality of rear sprockets having different tooth counts, and
the gear shift controller is further programmed to permit the rear derailleur to be shifted both in a direction toward a rear sprocket side having a large tooth count and in a direction toward the rear sprocket side having a small tooth count when the power level detected by the power supply sensor is lower than the first power level.

4. The bicycle control apparatus according to claim 2, wherein
the gear shift controller is further programmed to inhibit control of the first and second gear changing devices after controlling at least one of the first and second gear changing devices to a prescribed shifting position upon the power level being detected by the power supply sensor being lower than a second power level, which is lower than the first power level.

5. The bicycle control apparatus according to claim 2, wherein
the gear shift controller is further programmed to inhibit control of the first and second gear changing devices upon the power level being detected by the power supply sensor being lower than a second power level, which is lower than the first power level.

6. The bicycle control apparatus according to claim 2, further comprising:
a signal output unit operatively coupled to the gear shift controller to output a first signal to the gear shift controller, wherein
the gear shift controller is programmed to control at least one of the first and second gear changing devices in order to pass along the prescribed shifting route in response to the first signal upon the power level detected by the power supply sensor being higher than the first power level.

7. The bicycle control apparatus according to claim 6, wherein
the signal output unit is operatively coupled to the gear shift controller to output second signal to the gear shift controller, and
the gear shift controller is further programmed to control at least one of the first and second gear changing devices in order to pass along a portion of the prescribed shifting route in response to the second signal.

8. The bicycle control apparatus according to claim 6, wherein
the signal output unit is operatively coupled to the gear shift controller to output a third signal, a fourth signal and a fifth signal to the gear shift controller, and
upon the power level being detected by the power supply sensor being lower than the first power level, the gear shift controller is further programmed to
control the first gear changing device to shift in a direction toward a sprocket side having a small tooth count in response to the third signal,
control the second gear changing device to shift sequentially in a direction toward a first shifting direction in response to the fourth signal, and
control the second gear changing device to shift toward a second shifting direction that is opposite the first shifting direction in response to the fifth signal.

9. The bicycle control apparatus according to claim 1, further comprising
a notification unit operatively coupled to the power supply sensor to output a notification that the power level detected by the power supply sensor is lower than the first power level.

10. The bicycle control apparatus according to claim 1, wherein
the gear shift controller is programmed to cooperatively control the first and second gear changing devices in a first shifting mode and programmed to individually control the first and second gear changing devices in a second shifting mode upon the power level being detected by the power supply sensor being lower than the first power level, the gear shift controller configured to operate in one of the first shifting mode and the second shifting mode based on a selection.

11. A bicycle control apparatus comprising:
a first gear changing device having a plurality of first shifting positions, the first gear changing device including a front derailleur for moving a chain to any of a plurality of front sprockets having different tooth counts;
a second gear changing device having a plurality of second shifting positions;
a power supply sensor that detects a power level of a power supply configured to supply power to at least one of the first and second gear changing devices;
a gear shift controller programmed to cooperatively control at least one of the first and second gear changing devices along a prescribed shifting route including at least one of the plurality of first shifting positions and the plurality of second shifting positions upon the power level detected by the power supply sensor being higher than a first power level; and
a signal output unit operatively coupled to the gear shift controller to output a first signal to the gear shift controller,
upon the power level being detected by the power supply sensor being lower than the first power level, the gear shift controller being further programmed to individually control the first and second gear changing devices and to at least partially inhibit the front derailleur from shifting in a direction toward a front sprocket side having a large tooth count,
the gear shift controller being further programmed to control at least one of the first and second gear changing devices to pass along the prescribed shifting route in response to the first signal upon the power level detected by the power supply sensor being higher than the first power level,
the signal output unit being operatively coupled to the gear shift controller o output a third signal, a fourth signal and a fifth signal to the gear shift controller, and
upon the power level being detected by the power supply sensor being lower than the first power level, the gear shift controller being further programmed to:
control the first gear changing device to shift in a direction toward a sprocket side having a small tooth count in response to the third signal,
control the second gear changing device to shift sequentially in a direction toward a first shifting direction in response to the fourth signal, and
control the second gear changing device to shift toward a second shifting direction that is opposite the first shifting direction in response to the fifth signal.

* * * * *